(12) United States Patent
Nelson et al.

(10) Patent No.: US 9,033,713 B2
(45) Date of Patent: May 19, 2015

(54) METHOD AND DEVICE FOR INJECTING A FLUID INTO AN ARTIFICIAL VENOUS STRUCTURE

(71) Applicant: Nelson Medical Enterprises, LLC, North Olmsted, OH (US)

(72) Inventors: Dvora Y. Nelson, Westlake, OH (US); Craig B. Berky, Milford, OH (US); Thomas M. Kress, Cincinnati, OH (US)

(73) Assignee: NELSON MEDICAL ENTERPRISES, LLC, North Olmsted, OH (US)

( * ) Notice: Subject to any disclaimer, the term of this patent is extended or adjusted under 35 U.S.C. 154(b) by 0 days.

(21) Appl. No.: 13/665,134

(22) Filed: Oct. 31, 2012

(65) Prior Publication Data

US 2013/0109000 A1    May 2, 2013

Related U.S. Application Data

(60) Provisional application No. 61/663,154, filed on Jun. 22, 2012, provisional application No. 61/595,331, filed on Feb. 6, 2012, provisional application No. 61/554,595, filed on Nov. 2, 2011.

(51) Int. Cl.
*G09B 23/30* (2006.01)
*G09B 23/28* (2006.01)

(52) U.S. Cl.
CPC .................................. *G09B 23/285* (2013.01)

(58) Field of Classification Search
CPC ....... G09B 23/30; G09B 23/34; G09B 23/285; G09B 23/303
See application file for complete search history.

(56) References Cited

U.S. PATENT DOCUMENTS

| | | | |
|---|---|---|---|
| 2,689,415 A | | 9/1954 | Haver |
| 2,871,584 A | * | 2/1959 | Poole ............................ 434/268 |
| 2,995,832 A | * | 8/1961 | Alderson ...................... 434/268 |
| 3,789,518 A | | 2/1974 | Chase |
| 5,327,774 A | * | 7/1994 | Nguyen et al. ..................... 73/37 |
| 5,839,904 A | * | 11/1998 | Bloom ............................ 434/268 |
| 5,947,744 A | * | 9/1999 | Izzat ............................... 434/272 |
| 2013/0052626 A1 | * | 2/2013 | Hoskins ........................ 434/268 |

OTHER PUBLICATIONS

"Clinical Anatomy of the Subcutaneous Veins in the Dorsum of the Hand," Annals of Anatomy, Aug. 1993; 175(4):381-4 (Abstract).*
U.S. Patent and Trademark Office, International Search Report and Written Opinion in PCT Serial No. PCT/US2012/062953, Jan. 22, 2013.
U.S. Patent and Trademark Office, International Preliminary Report on Patentability in PCT Serial No. PCT/US2012/062953, May 15, 2014.

* cited by examiner

*Primary Examiner* — Robert J Utama
*Assistant Examiner* — Jennifer L Fassett
(74) *Attorney, Agent, or Firm* — Wood, Herron & Evans, L.L.P.

(57) ABSTRACT

A training device for sclerotherapy. The device includes at least one artificial venous structure adapted to contain a fluid, a reservoir, and a fluid path connecting the artificial venous structure to the reservoir.

12 Claims, 9 Drawing Sheets

METHOD AND DEVICE FOR INJECTING A FLUID INTO AN ARTIFICIAL VENOUS STRUCTURE

This application claims the priority of U.S. Provisional Application Ser. Nos. 61/663,154, filed Jun. 22, 2012; 61/595,331, filed Feb. 6, 2012; 61/554,595, filed Nov. 2, 2011, the disclosures of which are hereby incorporated by reference herein.

TECHNICAL FIELD

The present invention pertains to a training device for the injection of a fluid into a blood vessel, and a method for practicing vein therapy treatment. The present invention is particularly useful to physicians and other medical professionals to practice the medical procedure known as sclerotherapy.

BACKGROUND

Sclerotherapy is a procedure used in the field of medicine to treat vascular or lymphatic malformations in a non-invasive manner. Sclerotherapy is generally used for the treatment of varicose veins and telangiectatic veins, commonly referred to as spider veins. In treating vascular malformations, sclerotherapy is performed by inserting a fine needle into the target vein and dispensing a medicine or sclerosing solution into the vein by means of a syringe. The injection of the medicine or sclerosing solution causes the target vein to immediately shrink and eventually turn into scar tissue and fade from view.

Compared to invasive surgery, sclerotherapy requires minimal downtime. Sclerotherapy is largely preferred by both patients and physicians over other methods of vascular malformation treatment, for reasons of non-invasiveness, minimal procedural duration, low cost, and reduced risk of recurrence. In particular, sclerotherapy is commonly referred to as the "gold standard" for treatment of spider veins.

There is a demand for nurses, physicians, dermatologists, surgeons, and the like, who are capable of performing sclerotherapy safely and effectively. In particular, there exists a relatively high level of difficulty involved in accurately inserting the fine tip of a syringe needle into a narrow target lumen, or blood vessel. Hands-on training is essential for medical personnel to become accustomed to inserting the fine tip of the syringe needle at the proper location and depth. Training courses for sclerotherapy frequently require trainees either to practice the procedure on living human patients, or to observe demonstrations of the procedure on living human patients. A need therefore exists for a sclerotherapy training aid.

SUMMARY

The present invention provides a training device for use in vein therapy and, more specifically, comprises an artificial venous structure and a method for practicing vein therapy by injecting a fluid into the artificial venous structure. While the invention will be described in connection with certain embodiments, it will be understood that the invention is not limited to these embodiments. On the contrary, the invention includes all alternatives, modifications and equivalents as may be included within the spirit and scope of the present invention.

DETAILED DESCRIPTION

Figure 1:
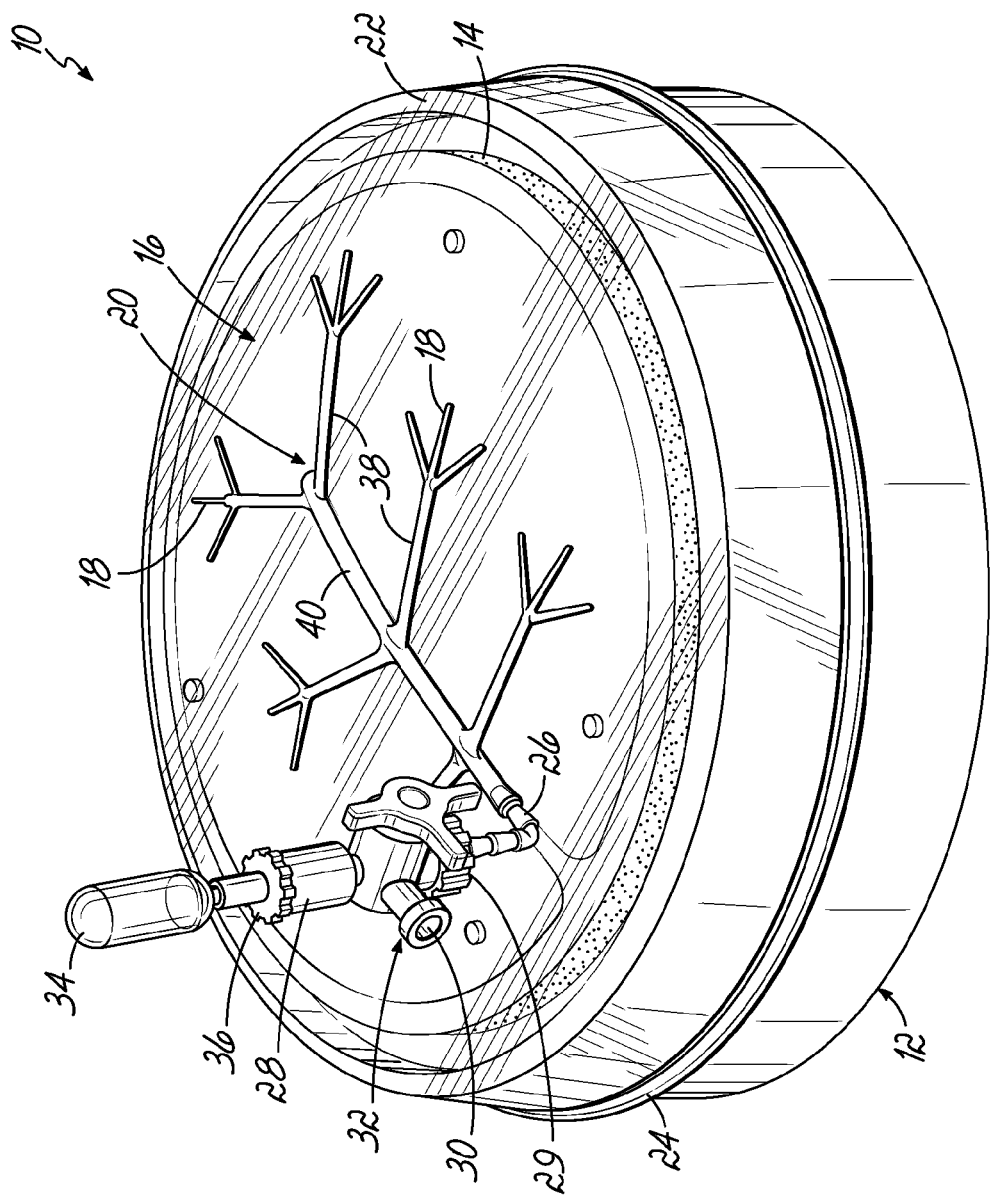
FIG. 1 is a perspective view of an exemplary sclerotherapy training device in accordance with the principles of the present disclosure.

FIG. 1 depicts an exemplary sclerotherapy training aid or device 10 in accordance with an illustrative embodiment of the present invention, including a circular vein model base 12, on top of which is a foam pad 14, which may be formed of a foam, such as a closed cell foam. Closed cell foam pad 14 is analogous to a layer of fat beneath the skin of a patient. On top of closed cell pad 14 is vein model 16, having a plurality of hollow artificial venous structures 18, 38, 40. In this embodiment, artificial venous structures 18, 38, 40 are linked together, forming artificial vein network 20. It is appreciated that further embodiments may contain a single artificial venous structure or any number of artificial venous structures, either linked together or unlinked. Also in this embodiment, polyurethane skin 22 is placed over vein model 16, and tautly secured to vein model base 12 by means of elastic cord 24. Polyurethane skin 22, or any other suitable material, is useful to represent human skin covering artificial venous structures 18, 38, 40.

In this embodiment, closed cell pad 14, vein model 16, and polyurethane skin 22 may be removed from vein model base 12 after excessive use and may be replaced. It is appreciated that closed cell pad 14, vein model 16, and polyurethane skin 22 instead may be permanently fixed into place on vein model base 12 and a disposable device may thus be provided instead of a reusable device.

Further, this embodiment includes barbed elbow 26, which connects the lumens of artificial vein network 20 to a connecting tube 28 by means of barbed male luer 29. In this embodiment, connecting tube 28 includes a port 30 provided for the purpose of filling artificial vein network 20 with a fluid. Stopcock 32 prevents fluid from exiting connecting tube 28 through port 30. Connecting tube 28 is further connected to expansion bulb 34 by means of barbed female luer 36. It will be appreciated that other manners of providing a fluid path between the artificial venous structure 18, 38, 40 and the reservoir 34 may be used instead. In this embodiment, expansion bulb 34 is provided as a reservoir to contain fluid overflow from artificial vein network 20 as will be described below.

Figure 2:
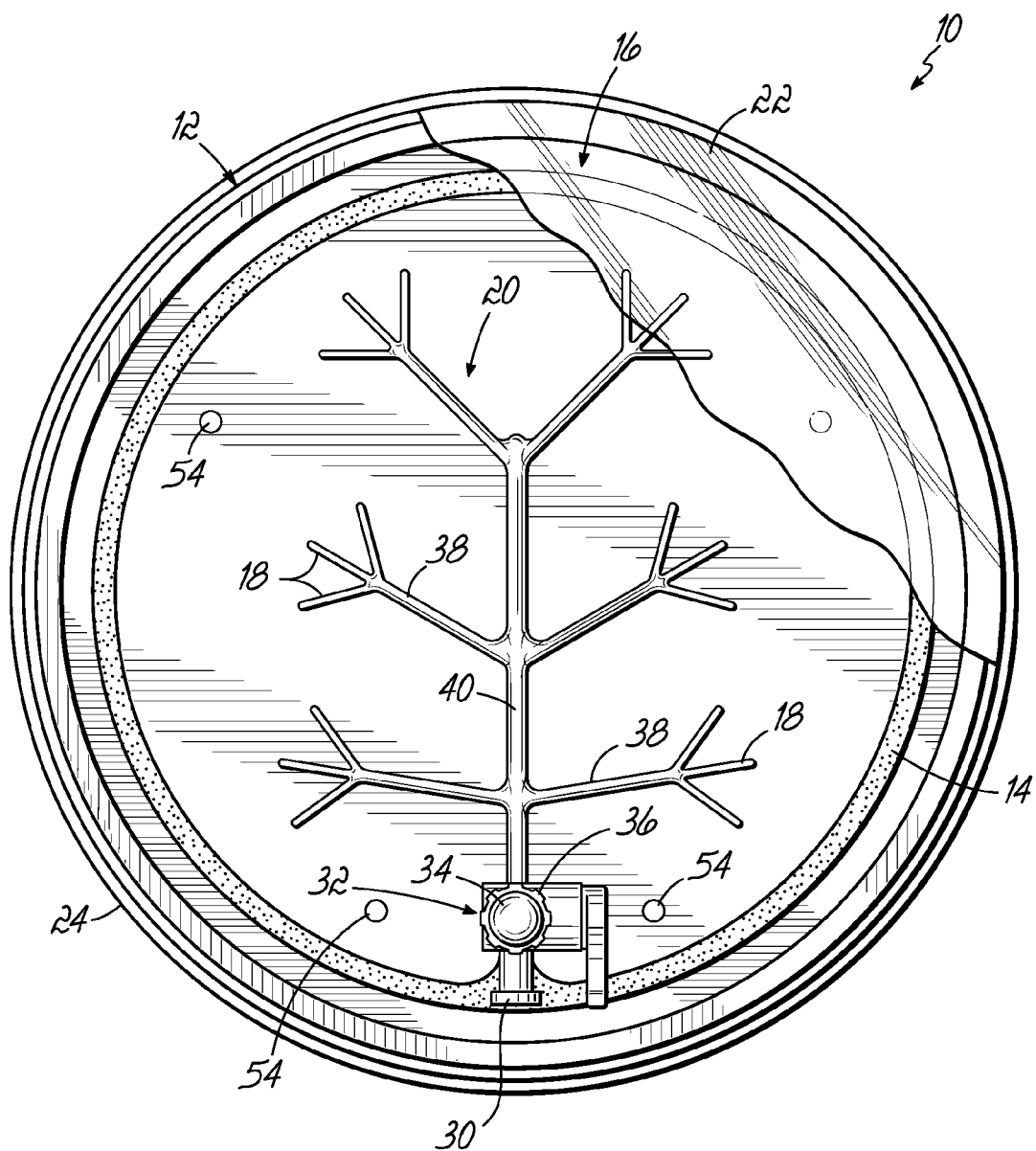
FIG. 2 is a top view of the exemplary sclerotherapy training device.

FIG. 2 shows a plurality of artificial venous structures 18, 38, 40 forming artificial vein network 20. In this embodiment, artificial venous structures 18, 38, 40 have diameters 1 mm, 2 mm, and 3 mm, respectively. These diameters approximately correspond to small blood vessel diameters in human patients. However, it is appreciated that venous structures of any suitable diameter may be used.

Figure 3:
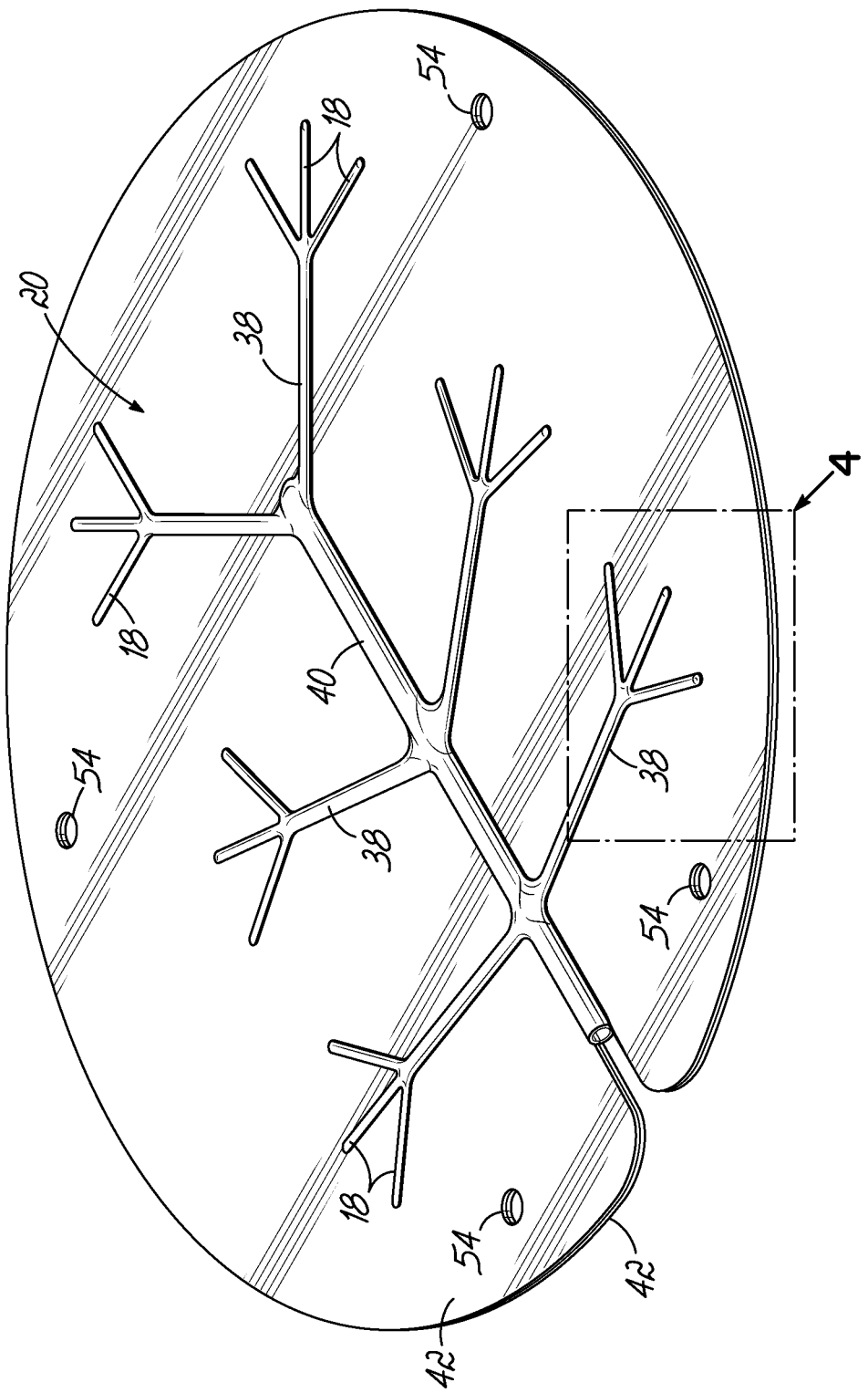
FIG. 3 is a perspective view of an exemplary artificial vein model used in the training device.

FIG. 3 depicts an exemplary artificial vein model 16 in accordance with the principles of the present disclosure, and clearly shows hollow artificial venous structures 18, 38, 40 forming artificial vein network 20.

Figure 4:
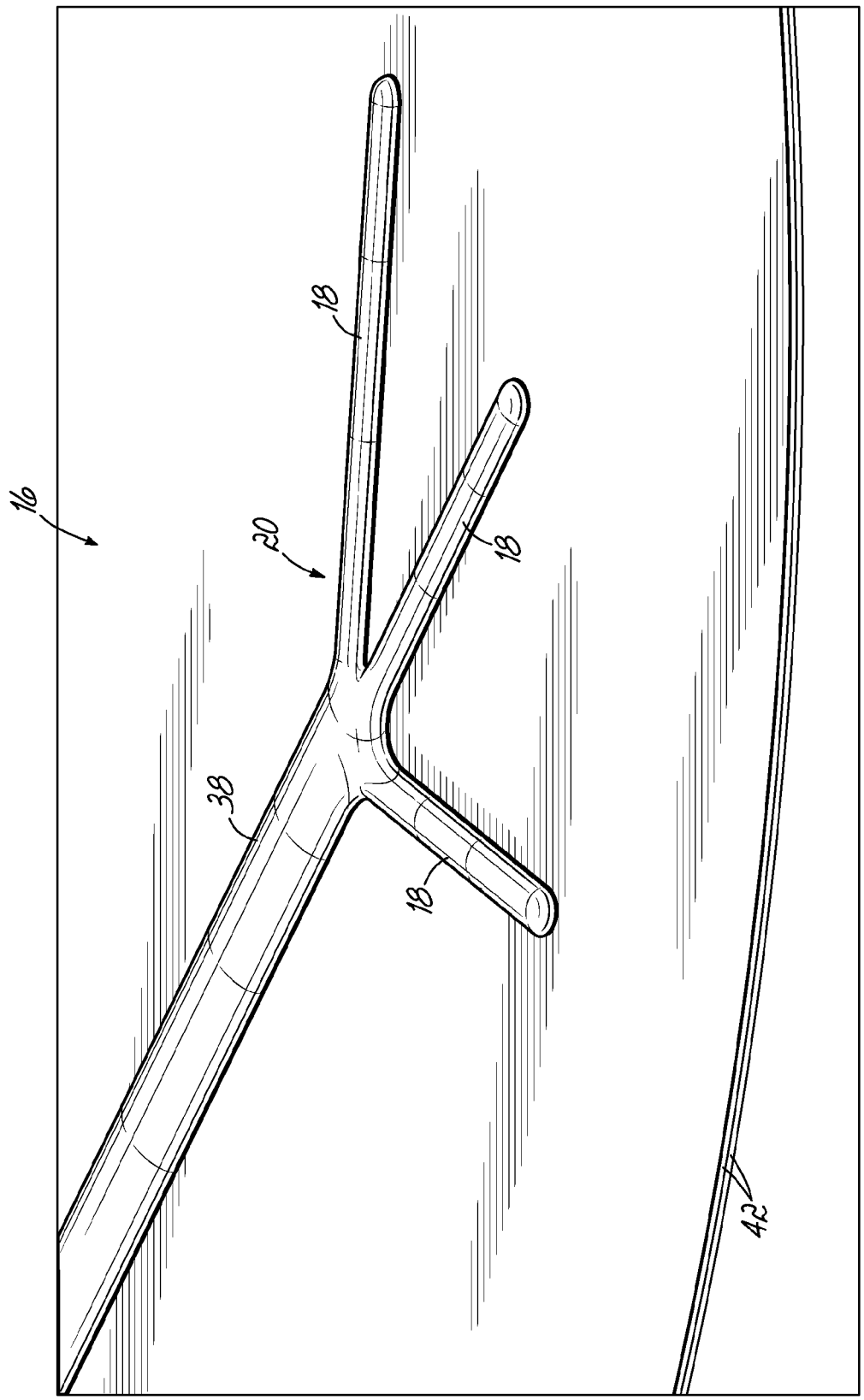
FIG. 4 is an enlarged view of the artificial model.

In accordance with the principles of the present disclosure, FIG. 4 depicts exemplary artificial venous structures 18 linking to each other and to exemplary artificial venous structure 38, forming a portion of artificial vein network 20 as shown in FIG. 3.

Figure 5:
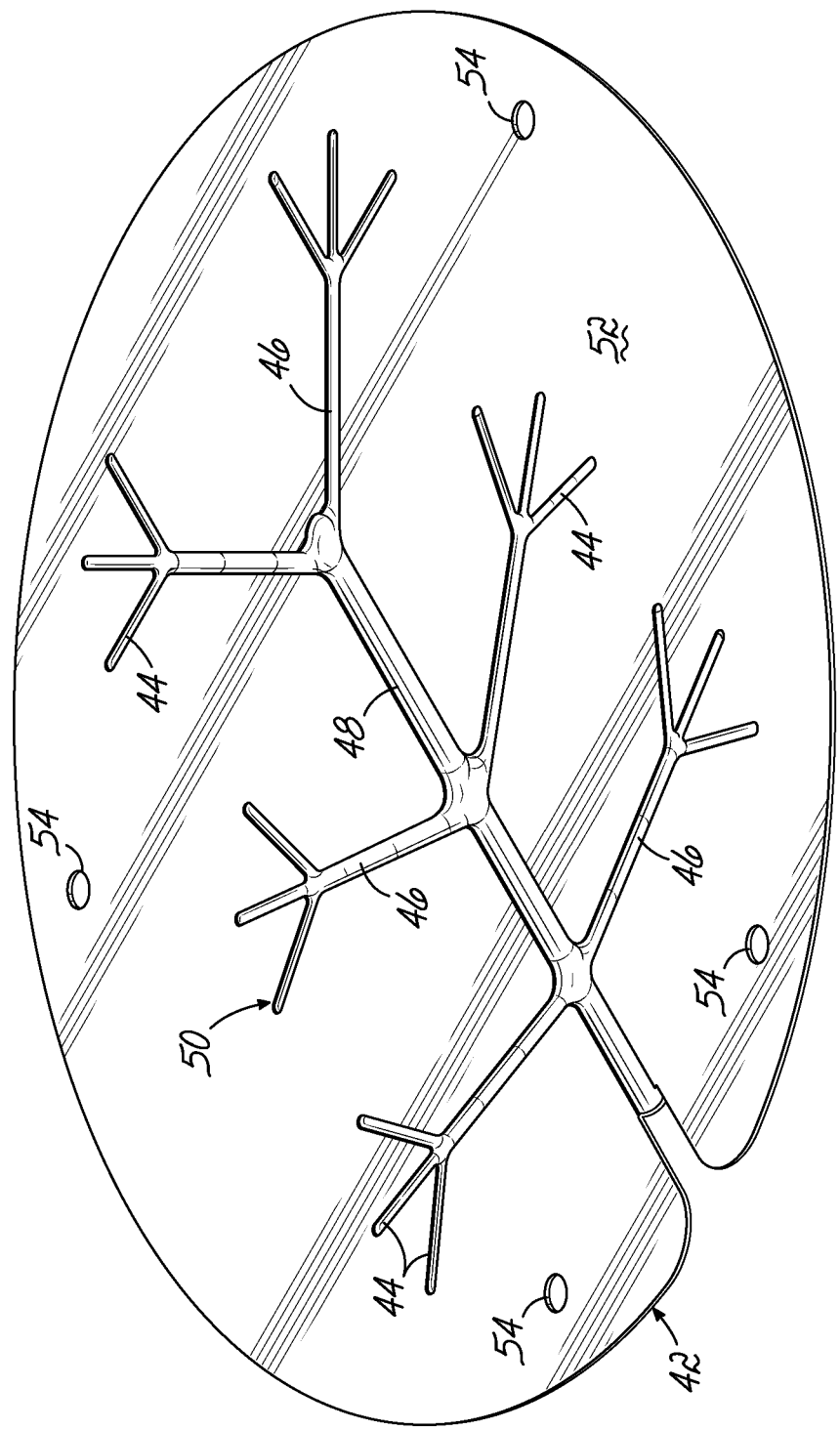
FIG. 5 is an isometric view of an open half of the artificial vein model of FIG. 3.

FIG. 5 depicts a top view of an open vein model half 42, having open artificial venous structure halves 44, 46, 48 forming open artificial vein network half 50. In one embodiment of the present invention, two open vein model halves 42 are aligned together and bonded together to produce vein model 16, as shown in FIG. 3. Adhesion area 52 provides sufficient space for an adhesive to be applied to one or more open vein model halves 42. Further, alignment holes 54 provide a means for two open vein model halves 42 to be properly positioned with respect to each other during assembly.

Figure 6:
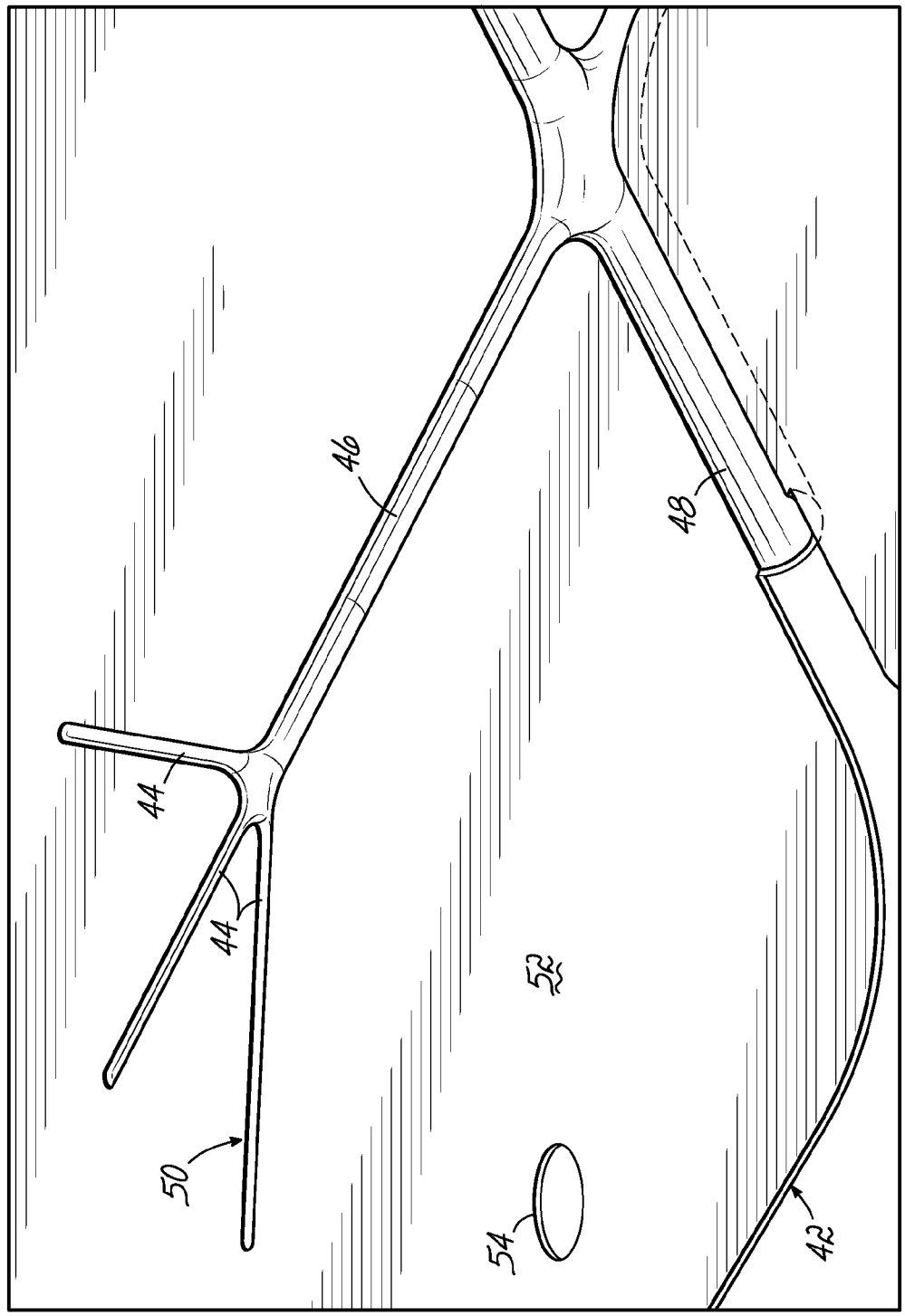
FIG. 6 is an enlarged perspective view of an open half of the artificial vein model.

FIG. 6 depicts open artificial venous structure halves 44, 46, 48 linking to each other, forming a portion of open artificial vein network half 50 as shown in FIG. 5.

In use, a training device, such as, but not limited to, sclerotherapy training aid 10 described herein, may be used by injecting a fluid into an artificial venous structure 18, 38, 40 and observing an indication of a successful injection.

Artificial vein network 20 comprised of at least one artificial venous structure 18, 38, 40 may be filled with a colored fluid to simulate blood contained in human blood vessels (i.e., typically veins). A syringe may be filled with a fluid, and a user (e.g., a trainee) inserts the fine, sharp tip of the syringe needle into one of fluid-filled artificial venous structures 18, 38, 40. The user may then begin to inject fluid.

If proper communication is made between the fine tip of the syringe needle and the fluid-filled artificial venous structure 18, 38, 40, then the fluid from the syringe will begin to displace the fluid contained within fluid-filled artificial venous structure 18, 38, 40 in the direction of connecting tube 28. If fluid-filled artificial venous structure 18, 38, 40 is linked to other fluid-filled artificial venous structures, then the fluid within artificial vein network 20 located between the pierced fluid-filled artificial venous structure 18, 38, 40 and the connecting tube 28 will be displaced in the direction of connecting tube 28. As the syringe continues to dispense fluid, displaced fluid will be forced through connecting tube 28 into expansion bulb 34. The user then visually observes that the presence of fluid in expansion bulb 34 indicates a successful injection.

If the fine tip of the syringe needle does not make proper contact and communication with fluid-filled artificial venous structure 18, 38, 40, for example, by being positioned any distance away from target fluid-filled artificial venous structure 18, 38, 40 or by being inserted too deeply through target artificial venous structure 18, 38, 40, then the fluid from the syringe may be dispensed into and absorbed by foam pad 14. The user may observe the absorption of any fluid by foam pad 14 as an indication of an unsuccessful injection.

In another aspect in accordance with the principles of the present invention, a sclerotherapy training aid 10, such as described above, may include any other suitable indicator, such as an electronic audio or visual indicator to indicate detection of displaced fluid.

Figure 7:
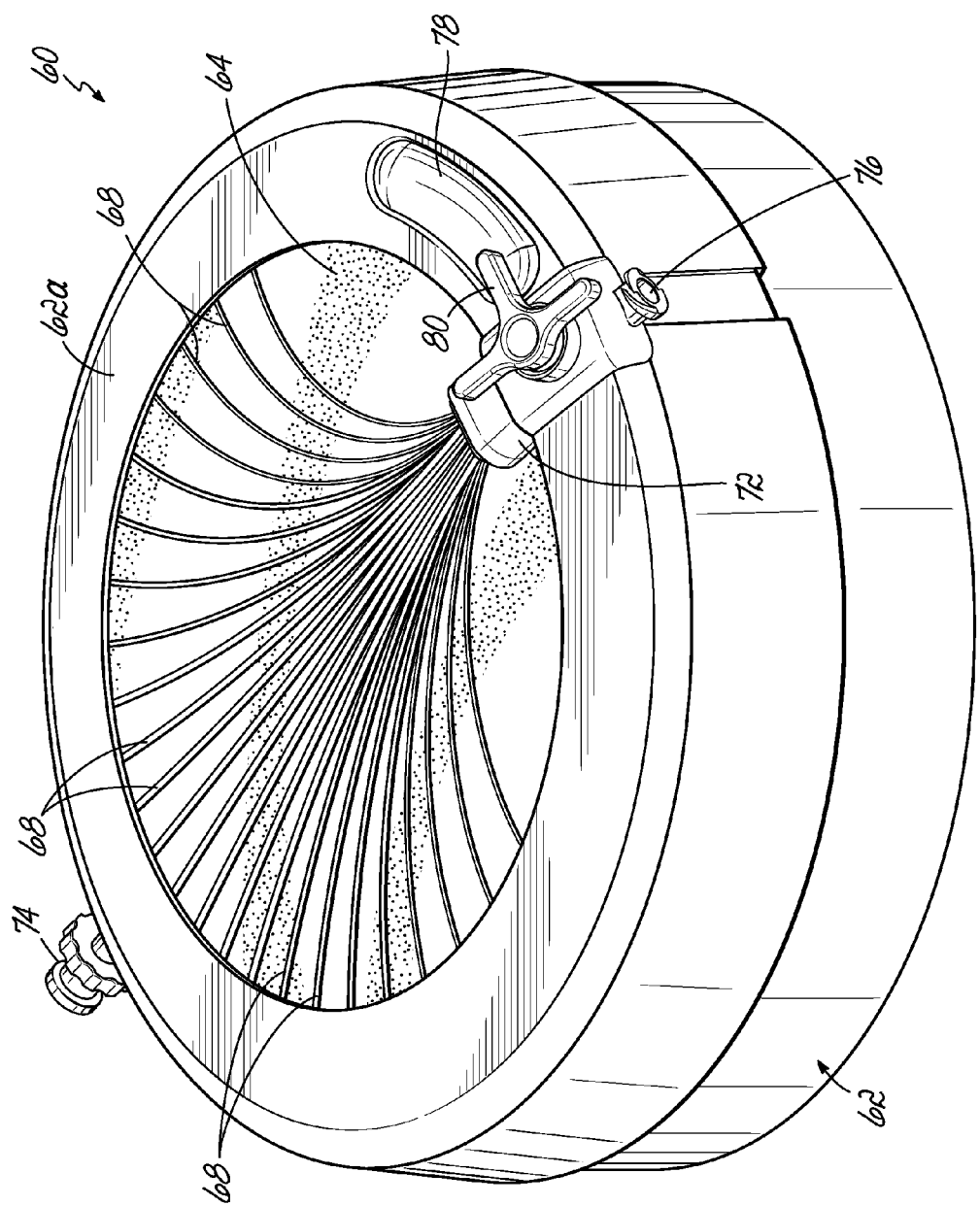
FIG. 7 is a perspective view of an alternative embodiment of a sclerotherapy training device.
Figure 8:
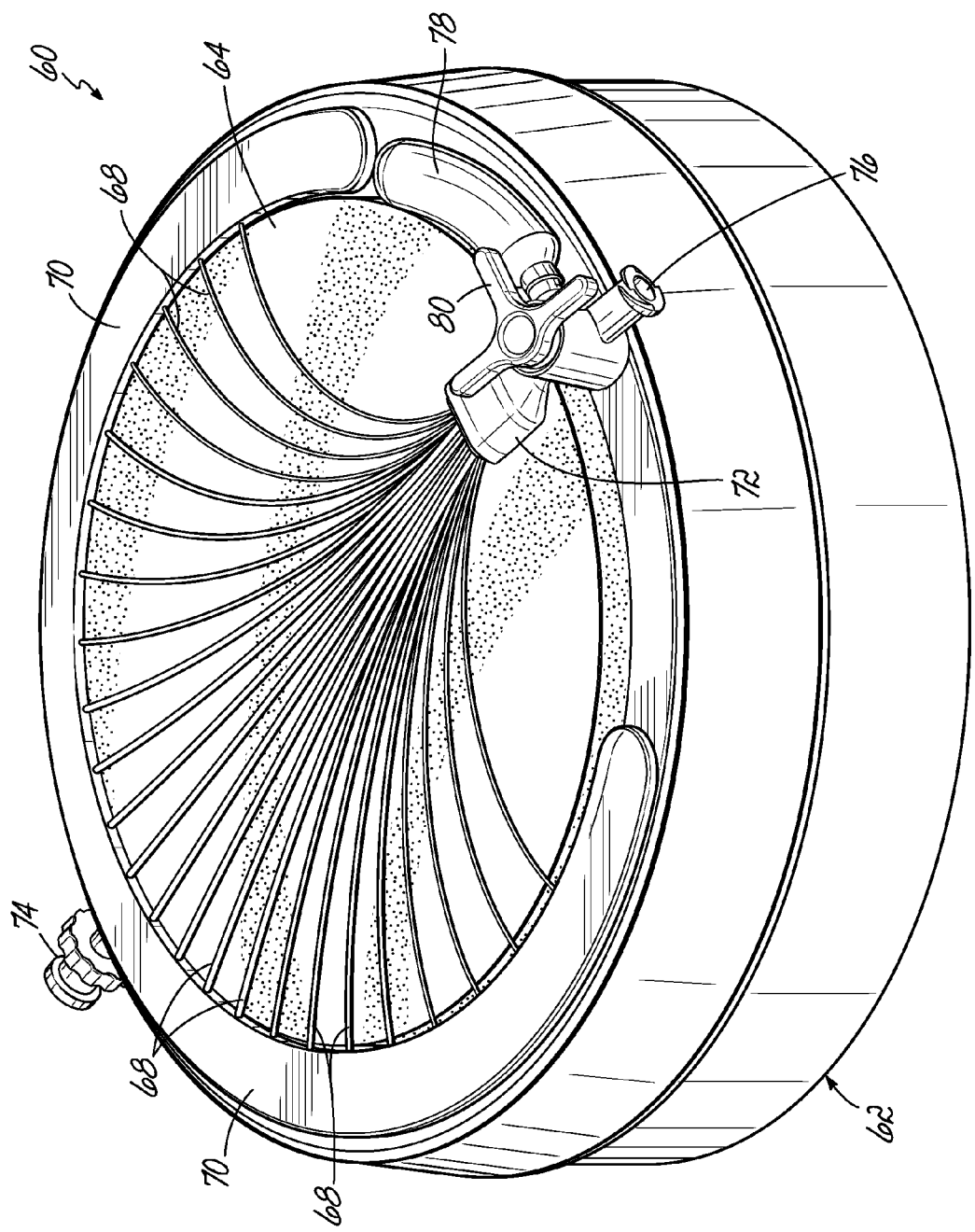
FIG. 8 is a perspective view of the device of FIG. 7 with the top cover removed.

FIGS. 7 and 8 depict an alternative sclerotherapy training aid or device 60 including a circular vein model base 62 with a top cover 62a (removed in FIG. 8). A pad 64, which may be formed of a foam, such as a closed cell foam, is coupled to the base 62. A plurality of hollow artificial venous structures 68 are in fluid communication with a manifold 70 (FIG. 8) at one end and a central conduit 72 that operates as a connecting tube at an opposite end. The artificial vein structures 68 may be formed as in the first embodiment. Also in this embodiment, a polyurethane or other skin layer is placed over vein structures 68 to represent human skin.

Further, this embodiment includes a luer type connector 74 for filling and/or emptying the manifold 70 as necessary and another fluid connector 76 is coupled at an opposite side of the device 60 for emptying and/or filling the vein structures 68 and a reservoir 78. A stopcock 80 prevents fluid from exiting through fluid connector 76 during a training procedure. Central conduit 72 is further connected to the reservoir 78 to contain fluid overflow from artificial vein structures 68 as described in connection with the first embodiment. When a needle (not shown) is properly inserted into one of the artificial vein structures 68 and fluid is discharged from the needle into the artificial vein structure 68, fluid (representing blood) that is stored in the artificial vein structure will be displaced through the central conduit 72 and through the valve passage (s) regulated by the stopcock 80 and into the reservoir 78 where it will be observed by the person in training. This will indicate a successful needle insertion into a target vein. Other aspects of this second embodiment may be included, such as any of those features described above in connection with the first embodiment. For example, the reservoir 78 may include at least a translucent or transparent portion to enable the visibility of the fluid inside the reservoir 78 following a successful injection, as described previously in connection with the translucent or transparent expansion bulb 34 shown in FIG. 1.

Figure 9:
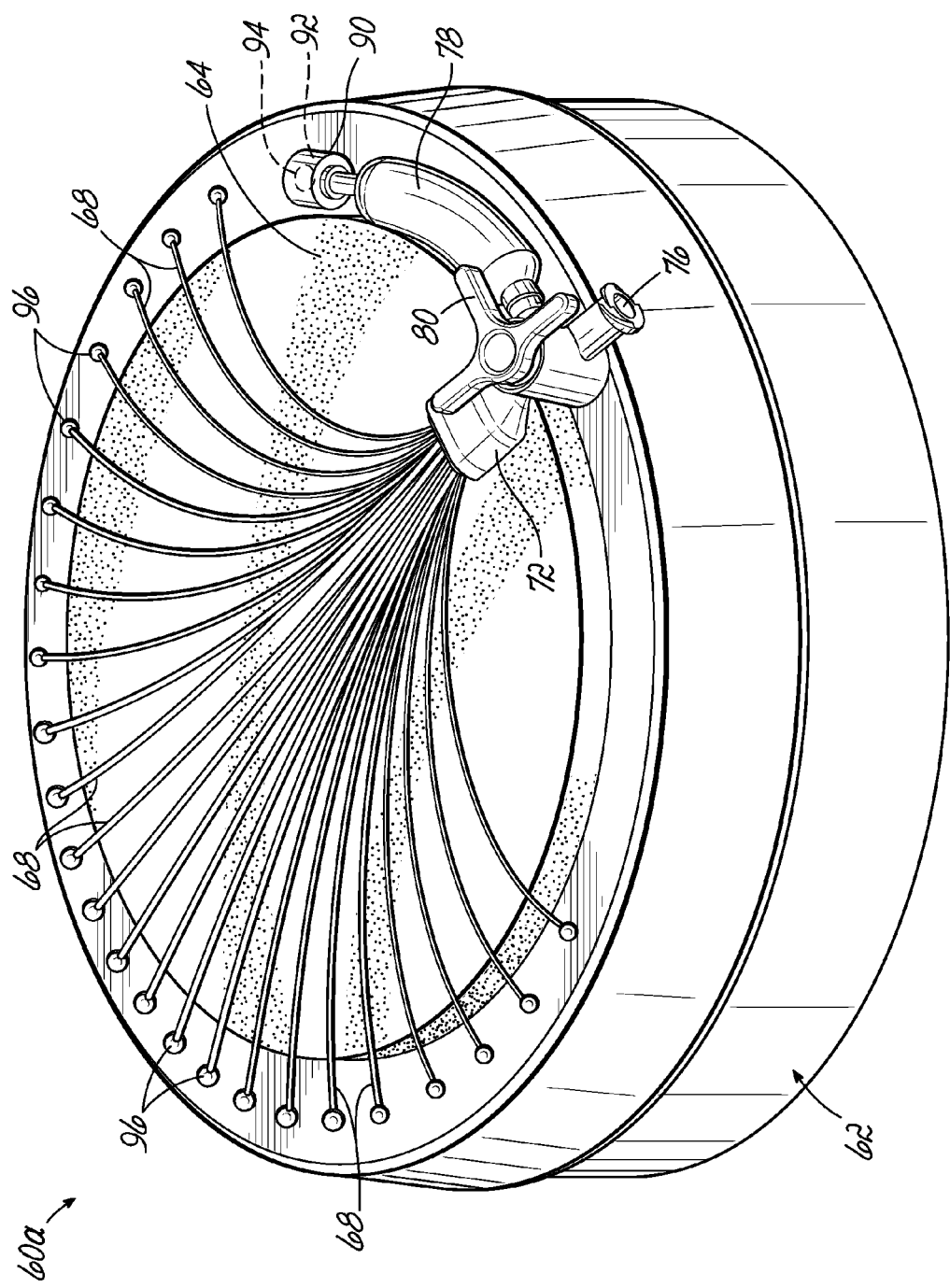
FIG. 9 is a perspective view of a device according to a third embodiment.

FIG. 9 depicts an alternative sclerotherapy training aid or device 60a. Like reference numerals in FIG. 9 indicate elements of like structure and function from the embodiment of FIGS. 7 and 8. Therefore, additional description of these like elements is not necessary here, but is apparent in the prior description. This embodiment includes a vent 90 coupled in fluid communication with the reservoir 78 so that as the reservoir fills with fluid injected through the artificial venous structures, the air from the reservoir 78 will escape. The vent comprises a housing containing a filter 92 and having one or more suitable openings 94 to atmosphere. Also in this embodiment, the hollow artificial venous structures 68 are closed at their respective distal ends by clips 96. It should also be noted that the surface of the pad 64 may be tacky to assist with securing the artificial venous structures 68 in the desired pattern. The artificial venous structures 68 themselves are formed by extrusion of silicone, and have internal lumen diameters of, for example, 0.5 mm-1.0 mm. The pad 64 is formed of a viscoelastic polymer, such as AKTON® viscoelastic polymer, which has a durometer hardness of 35D, and is available from Action Products, Inc., Hagerstown, Md. The polyurethane skin over the pad 64 is 0.003 inches thick. The skin, pad 64 and venous structures 68 may be thermoformed together with the assistance of vacuum and then assembled to the base 62. The other aspects of this embodiment may be included, such as any of those features described above in connection with the first two embodiments.

While the present invention has been illustrated by the description of one or more exemplary embodiments, and while the embodiments have been described in considerable detail, they are not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details, representative apparatus and method and illustrative examples shown and described. Accordingly, departures may be made from such details without departing from the scope or spirit of the general inventive concept.

What is claimed is:

1. A training device, comprising:
a base defining a periphery;
at least one piercable artificial venous structure adapted to contain a fluid and mounted on the base, the artificial venous structure defined by a plurality of artificial veins having first terminal ends and second terminal ends, all of the first terminal ends positioned adjacent to one another at one location along the periphery of the base, and the plurality of artificial veins spreading apart from each other to extend across the base in different directions to the second terminal ends which are located around a remainder of the periphery of the base away from the one location, the plurality of artificial veins including different internal lumen diameters to enable testing of piercing different sizes of veins with a needle;
a reservoir that is at least translucent or transparent enough so as to make fluid inside the reservoir observable by a user from an exterior of the training device;
a fluid path connecting the artificial venous structure at the first terminal ends of the plurality of artificial veins to the reservoir, the fluid path including an inlet connector configured to fill or empty the artificial venous structure with the fluid, a central conduit extending from the artificial venous structure, and a valve passage communicating with the inlet connector, the central conduit, and the reservoir; and
a flow regulation device operatively communicating with the fluid path and including a stopcock that regulates flow through the valve passage such that fluid may be added into the artificial venous structure from the inlet connector, and then such that fluid successfully injected into the artificial venous structure by a user is prevented from flowing through the inlet connector and is routed by the stopcock into the reservoir from the central conduit,
wherein the user can pierce the artificial venous structure with a needle and inject fluid into the artificial venous structure, whereby fluid can flow through the fluid path into the reservoir and is visible in the reservoir from the exterior of the training device following a successful injection of fluid into the artificial venous structure.

2. The training device of claim 1, further comprising a foam pad disposed beneath said at least one artificial venous structure.

3. The training device of claim 1, further comprising a polyurethane skin disposed above said at least one artificial venous structure through which the needle may be directed.

4. The training device of claim 1, wherein said reservoir is an expansion bulb.

5. The training device of claim 1, further comprising a vent coupled in fluid communication with said reservoir.

6. The training device of claim 1, wherein said artificial venous structure includes a first end defined by the first terminal ends of the artificial veins and a second end defined by the second terminal ends of the artificial veins, said first end being coupled in fluid communication with said reservoir via said central conduit and said second end being closed.

7. The training device of claim 1, further comprising a foam pad disposed beneath said at least one artificial venous structure and a skin disposed above said at least one artificial venous structure,
said foam pad, artificial venous structure, and skin being thermoformed together as a unit.

8. The training device of claim 1, further comprising a manifold, with the plurality of artificial veins communicating between said manifold at one end and said fluid path at an opposite end.

9. The training device of claim 1, wherein the artificial venous structure includes a plurality of internal lumen diameters of 0.5 millimeters to 1.0 millimeters.

10. A training device, consisting of:
a base;
at least one piercable artificial venous structure mounted on the base and adapted to contain a fluid, the artificial venous structure defined by a plurality of artificial veins;
a foam pad disposed beneath the at least one artificial venous structure;
a polyurethane skin disposed above the at least one artificial venous structure;
a reservoir that is at least translucent or transparent enough so as to make fluid inside the reservoir observable by a user from an exterior of the training device;
a fluid path connecting the artificial venous structure to the reservoir, the fluid path including an inlet connector configured to fill or empty the artificial venous structure with the fluid, a central conduit extending from the artificial venous structure, and a valve passage communicating with the inlet connector, the central conduit, and the reservoir; and
a flow regulation device operatively communicating with the fluid path and including a stopcock that regulates flow through the valve passage such that fluid may be added into the artificial venous structure from the inlet connector, and then such that fluid successfully injected into the artificial venous structure by a user is prevented from flowing through the inlet connector and is routed by the stopcock into the reservoir from the central conduit.

11. The training device of claim 10, wherein the artificial venous structure includes a plurality of internal lumen diameters of 0.5 millimeters to 1.0 millimeters.

12. The training device of claim 10, wherein the plurality of artificial veins included in the artificial venous structure define different internal lumen diameters to enable testing of piercing different sizes of veins with a needle.

* * * * *